US008194930B2

(12) United States Patent
Jeon et al.

(10) Patent No.: US 8,194,930 B2
(45) Date of Patent: Jun. 5, 2012

(54) IMAGE PROCESSING APPARATUS AND METHOD FOR REAL-TIME MOTION DETECTION

(75) Inventors: Jae Wook Jeon, Suwon-si (KR); Seung Hun Jin, Suwon-si (KR); Dong Kyun Kim, Suwon-si (KR); Ki Hoon Kim, Suwon-si (KR); Sang Jun Lee, Suwon-si (KR); Duc Dung Nguyen, Suwon-si (KR)

(73) Assignee: Sungkyunkwan University Foundation For Corporate Collaboration, Cheoncheon-Dong, Jangan-Gu, Gyeonggi-Do, Suwon-Si (KR)

( * ) Notice: Subject to any disclaimer, the term of this patent is extended or adjusted under 35 U.S.C. 154(b) by 855 days.

(21) Appl. No.: 12/326,024

(22) Filed: Dec. 1, 2008

(65) Prior Publication Data
US 2009/0245586 A1 Oct. 1, 2009

(30) Foreign Application Priority Data
Mar. 31, 2008 (KR) .................. 10-2008-0029744

(51) Int. Cl.
*G06K 9/00* (2006.01)
*H04B 1/66* (2006.01)
(52) U.S. Cl. .................. 382/107; 382/291; 375/240.16
(58) Field of Classification Search .................. 382/100, 382/103, 106, 107, 154, 168, 173, 181, 194, 382/209, 220, 232, 254, 274, 286–293, 305, 382/312; 375/240.16; 348/47
See application file for complete search history.

(56) References Cited

U.S. PATENT DOCUMENTS

| 6,141,036 | A  | * | 10/2000 | Katayama et al. | ............... 348/47 |
| 6,169,766 | B1 | * | 1/2001  | Aoki et al.     | ............... 375/240.16 |
| 6,873,724 | B2 | * | 3/2005  | Brand           | ........................... 382/154 |
| 7,440,619 | B2 | * | 10/2008 | Mishima et al.  | ............... 382/209 |
| 7,684,486 | B2 | * | 3/2010  | Ha              | ........................... 375/240.16 |
| 7,925,077 | B2 | * | 4/2011  | Woodfill et al. | ............... 382/154 |

OTHER PUBLICATIONS

Rebert Szewczyk et al., Motion and Feature-Based Video Metamorphosis, 5th ACM international Conference on Multimedia, Department of Computer Science Cornell University, 1997 11.09~13.

* cited by examiner

*Primary Examiner* — Seyed Azarian
(74) *Attorney, Agent, or Firm* — Lexyoume IP Group, PLLC.

(57) ABSTRACT

An image processing apparatus and method for real time motion detection is provided. In the apparatus, a sub-sampling module receives and sub-samples a current image and a plurality of previous images and a census transform module performs census transform on each of the sub-sampled images to obtain a census vector. A correlation calculation module calculates and compares correlation values between the current image and the plurality of previous images and detects a region having highest correlation. A motion detection module tracks positions of pixels corresponding to the region having the highest correlation to detect motion information in the images. The image processing apparatus and method can obtain, in real time, the direction and speed of an object that is in motion in each image.

9 Claims, 7 Drawing Sheets

IMAGE PROCESSING APPARATUS AND METHOD FOR REAL-TIME MOTION DETECTION

BACKGROUND OF THE INVENTION

1. Field of the Invention

The present invention relates to an image-based real time motion detection method and apparatus and an image processing apparatus and method for real time motion detection and more particularly to a hardware structure for analyzing an image captured by a camera and extracting motion information of an object that is present in the image in real time from the image.

2. Description of the Related Art

Since objects with various sizes and shapes are present in an image, it is very difficult to determine the direction or speed of the motion of each object present in the image. To determine motion of an object, in principle, it is necessary to check all pixels of a currently input image and one or more previously input images.

Since the method of checking all pixels requires repetitive calculations of a large amount of information and a large number of memory accesses, the method is not suitable for a general-purpose computer that is based on sequential processing and also significantly reduces overall system efficiency. Specifically, if the size of each image and the number of images input per second are increased, the amount of data to be processed is significantly increased and thus cannot be processed in real time in a system based on a general-purpose computer. Therefore, detection of motion of an object in an image captured by a camera is one of the most difficult challenges in image processing.

However, to obtain motion information in real time from a current image and one or more previous images, i.e., to obtain information of changed portions of an image, it is more desirable to use a method of simultaneously obtaining and processing images than to use a method in which, after all images are stored in an external memory, the images are sequentially read and processed from the memory. However, structurally, it is not possible for the system based on the general-purpose computer to implement such a processing method and thus the system inevitably employs inefficient processing, thereby causing a lot of problems in terms of cost, power, and size.

SUMMARY OF THE INVENTION

Therefore, the present invention has been made in view of the above problems, and it is an object of the present invention to provide an image processing apparatus and method for real time motion detection in which information regarding portions of a currently input image that are changed from one or more previous images, i.e., motion information of the currently input image, is extracted and processed in real time using a hardware-based method rather than a software-based method.

In accordance with one aspect of the present invention, the above and other objects can be accomplished by the provision of an image processing apparatus for real time motion detection including a sub-sampling module that receives and sub-samples a current image and a plurality of previous images, a census transform module that performs census transform on each of the sub-sampled images to obtain a census vector, a correlation calculation module that calculates and compares correlation values between the current image and the plurality of previous images using the census vector and detects a region having highest correlation, and a motion detection module that tracks positions of pixels corresponding to the region having the highest correlation to detect motion information in the images.

The image processing apparatus may further include a buffer module including a plurality of readable and writeable frame buffers and allowing simultaneous access to a currently input image and at least one previous image.

The sub-sampling module may perform sub-sampling using, as a sub-sampling interpolation method, at least one of bilinear interpolation, nearest-neighbor interpolation, and cubic convolution interpolation. The sub-sampling module may also reduce a size of an original image using at least one ratio and obtain at least one sub-sampled image having a different resolution from the original image.

The correlation calculation module may define lower-level windows in each region to be compared and obtain a correlation value between the lower-level windows through an XOR operation between the lower-level windows.

The motion detection module may check frequency components of an input image and select sub-sampled images for comparison of correlation values according to the frequency components. This enables more efficient motion detection.

In accordance with another aspect of the present invention, the above and other objects can be accomplished by the provision of an image processing method for real time motion detection including receiving and sub-sampling a current image and a plurality of previous images, performing census transform on each of the sub-sampled images to obtain a census vector, calculating and comparing correlation values between the current image and the plurality of previous images based on the census vector and detecting a region having highest correlation, and tracking positions of pixels corresponding to the region having the highest correlation to detect motion information in the images.

The sub-sampling step may include performing sub-sampling using, as a sub-sampling interpolation method, at least one of bilinear interpolation, nearest-neighbor interpolation, and cubic convolution interpolation. The sub-sampling step may also include reducing a size of an original image using at least one ratio and obtaining at least one sub-sampled image having a different resolution from the original image.

The correlation calculation step may include defining lower-level windows in each region to be compared and obtaining a correlation value between the lower-level windows through an XOR operation between the lower-level windows.

The motion detection step may include checking frequency components of an input image and selecting sub-sampled images for comparison of correlation values according to the frequency components.

The image processing apparatus and method for real time motion detection according to the present invention can obtain, in real time, the direction and speed of an object that is in motion in an image without using a computer system or a software program. Especially, the image processing apparatus for real time motion detection according to the present invention can be simply implemented by hardware and thus can be easily applied to robot vision, intelligent cameras, or industrial fields.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

An image processing apparatus and method for real time motion detection according to the present invention will now be described in detail with reference to the accompanying drawings.

Figure 1:
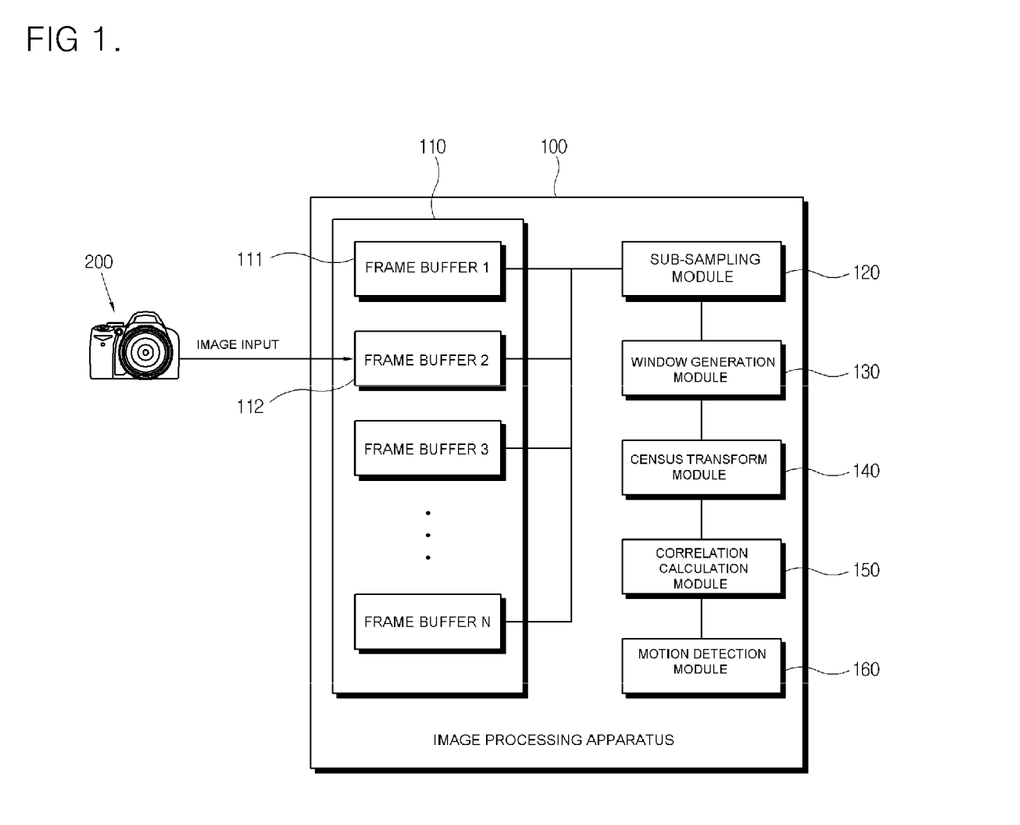
FIG. 1 illustrates a configuration of an image processing apparatus for real time motion detection according to an embodiment of the present invention.

FIG. 1 illustrates a configuration of an image processing apparatus for real time motion detection according to an embodiment of the present invention.

As shown in FIG. 1, the image processing apparatus for real time motion detection 100 according to the present invention may include six modules, i.e., a buffer module 110, a sub-sampling module 120, a window generation module 130, a census transform module 140, a correlation calculation module 150, and a motion detection module 160.

As described above, it is preferable that the lower-level components of the image processing apparatus for real time motion detection according to the present invention be implemented by hardware rather than by software.

The buffer module 110 may include a number of readable and writeable memories. The buffer module 110 may include frame buffers 1 to n. Current image data input from a camera 200 is stored in the frame buffer 1.

In a next period, the current image data stored in the frame buffer 1 is transferred to and stored in the frame buffer 2 and new current image data input from the camera 200 is stored in the frame buffer 1. This operation is repeated every period.

The image data stored in each frame buffer of the buffer module 110 is transferred to the sub-sampling module 120. It is more preferable that the sub-sampling module 120 be able to simultaneously access the frame buffers of the buffer module 110 to read data therefrom. This is because such a function enables faster image processing.

The sub-sampling module 120 performs sub-sampling on the current image data and one or more previous image data read from the frame buffers. In this case, the sub-sampling module 120 can use a variety of sub-sampling interpolation methods such as bilinear interpolation, nearest-neighbor interpolation, and cubic convolution interpolation.

The sub-sampling module 120 can perform sub-sampling of a variety of layers, which affects both the accuracy of detection results and total hardware size. The number of sub-sampled images to be generated to obtain better final results may vary depending on circumstances.

The window generation module 130 generates a window of each image using a window-based image processing structure. A detailed description of the method for generating the window is omitted herein. Here, the size of the window may be changed to a variety of sizes according to precision or accuracy of the resulting image. The determined size of the window is used as a parameter for determining the length of a census vector generated by the census transform module 140.

Figure 2:
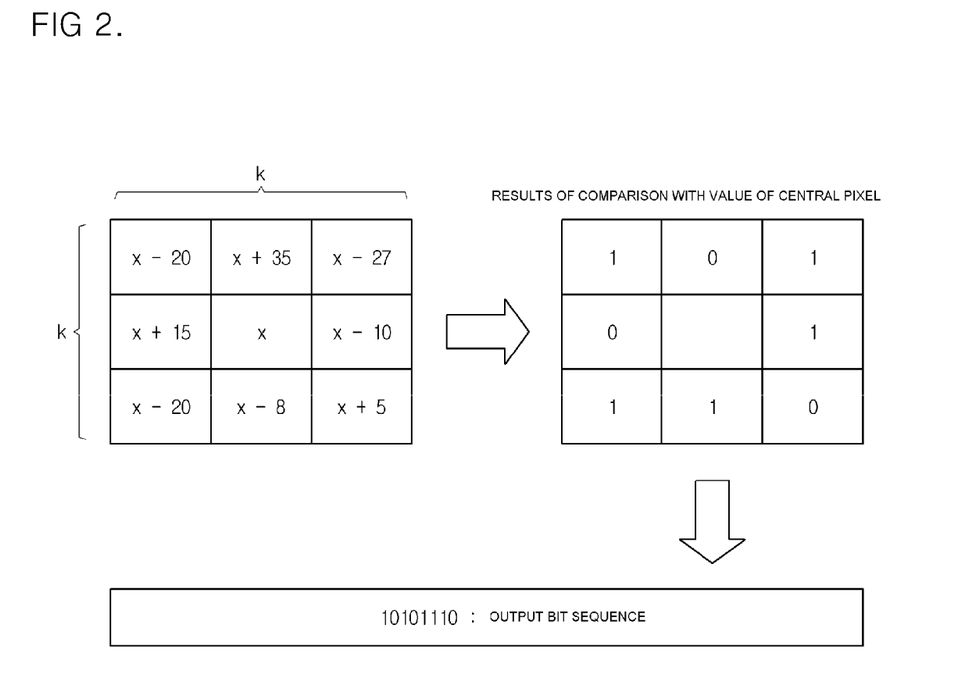
FIG. 2 illustrates a method for generating a census vector based on a window.

The census transform module 140 generates census vectors based on the window generated by the window generation module 130 through calculations illustrated in FIG. 2.

census transform is a well-known type of conversion. First, the census transform module 140 compares a gray level of a pixel located at the center of the window with a gray level of each neighbor pixel. The census transform module 140 outputs a bit value of "0" for the neighbor pixel when the gray level of the pixel located at the center is greater than the gray level of the neighbor pixel and outputs a bit value of "1" for the neighbor pixel when the gray level of the pixel located at the center is less than the gray level of the neighbor pixel.

Alternatively, the census transform module 140 may output a bit value of "1" when the gray level of the central pixel is greater than the gray level of the neighbor pixel and output a bit value of "0" when the gray level of the central pixel is less than the gray level of the neighbor pixel since the output value simply indicates whether the center pixel or the neighbor pixel is greater.

The census vector generated in this manner is a bit sequence including 0s and 1s. Each bit sequence has a value representing information of a corresponding pixel and its neighbor pixels.

As described above, when a window having a size of k×k is used, the length of the census vector is (k×k−1) which is obtained by subtracting 1 from the total number of pixels corresponding to the size of the window. For example, the length of the census vector is 24 (=5×5−1) when a 5×5 window is used and is 8 (=3×3−1) when a 3×3 window is used.

Here, different sizes of windows may be used depending on circumstances since the window size may affect the accuracy of motion information, the size of hardware, execution (or processing) speed, etc.

Through the operations of the window generation module 130 and the census transform module 140, the image processing apparatus 100 according to the present invention performs census transform on all of the current image, one or more previous images, and sub-sampled versions of the current and previous images and obtains a set of census vectors as a conversion result.

The correlation calculation module 150 generates a census vector window based on the obtained census vectors using the window generation module 130. The correlation calculation module 150 compares this census vector window with neighbor census vector windows to locate a neighbor census vector window with the highest correlation.

Figure 3:
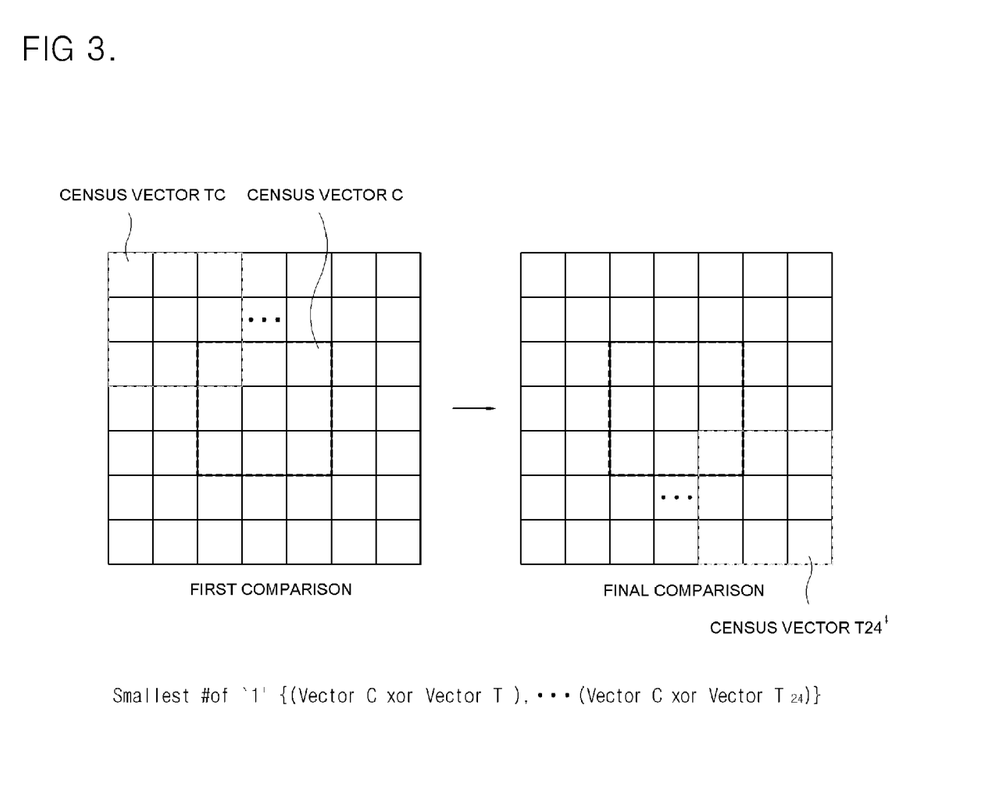
FIG. 3 illustrates a method for obtaining a correlation value using a window.

As shown in FIG. 3, the correlation calculation module 150 defines (or selects) an upper-level window corresponding to a region to be compared in each image and defines lower-level windows in the region of the upper-level window and obtains a correlation value between each pair of lower-level windows through an XOR operation therebetween. When each pair of bit sequences are compared, a pair of bit sequences which yields the lowest number of is in the XORed bit sequence of the two bit sequences can be determined to have highest correlation since the number of is in the XORed bit sequence increases as the number of different bits in the two bit sequences increases and thus a highest correlation value is assigned to the pair of bit sequences.

The motion detection module 160 detects motion (i.e., motion information) of an image according to correlation values finally obtained from the current image, one or more previous images, and respective sub-sampled versions of the current and previous images.

Figure 4:
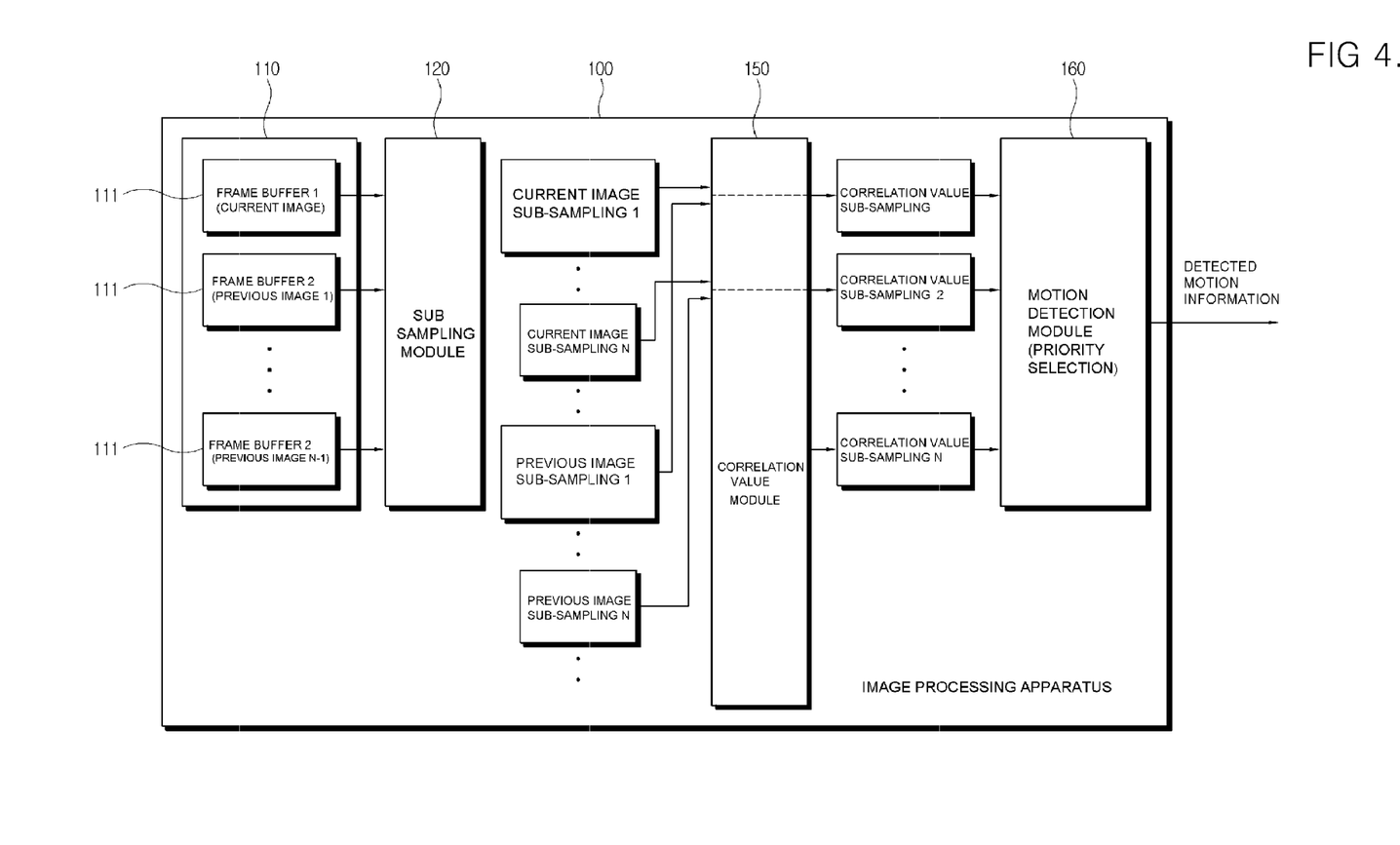
FIG. 4 illustrates a configuration of an image processing apparatus according to another embodiment of the present invention.

FIG. 4 illustrates a configuration of an image processing apparatus according to another embodiment of the present invention.

Similar to the image processing apparatus of FIG. 1, the image processing apparatus of FIG. 4 includes a buffer module 110, a sub-sampling module 120, a correlation calculation module 150, and a motion detection module 160. The image processing apparatus 100 of FIG. 4 includes a sub-sampling module 120 and a census transform module 140.

The motion detection module 160 of FIG. 4 presets priority for selecting a sub-sampled version of an image according to the frequency of the image. The motion detection module 160 then analyzes the frequency of an input image and selects a sub-sampled version having priority according to the frequency components to extract motion information. The following is a more detailed description.

Since the original image of FIG. 4 has high image quality, the original image is suitable for detecting motion information of detailed portions. However, in return for this advantage, the original image has a problem in that it is sensitive to noise.

The sub-sampled image is robust to noise and allows motion detection based on boundaries of an object although it is difficult to detect detailed motion information (for example, motion information of a portion of a size of ⅓) since the size of the sub-sampled image is less than that of the original image.

Since the original image and the sub-sampled image each have such an advantage and problem, the image processing apparatus 100 according to the present invention analyzes the frequency components of the images and selects an image suitable for the analysis result to obtain motion information.

The correlation calculation module 150 of FIG. 4 receives sub-sampled versions 1 to n of the current image and sub-sampled versions 1 to n of previous images. The correlation calculation module 150 compares the sub-sampled version 1 of the current image with the sub-sampled version 1 of each of the previous images and calculates a correlation value therebetween. The correlation calculation module 150 compares the sub-sampled version 2 of the current image with the sub-sampled version 2 of each of the previous images and calculates a correlation value therebetween.

The motion detection module 160 according to the present invention analyzes whether high frequency components or low frequency components are more dominant in an input image. The motion detection module 160 can use a Fourier transform or dynamic threshold technique in order to analyze the frequency components.

Then, using the analyzed frequency components, the motion detection module 160 selects one of a number of correlation values received from the correlation calculation module 150 for detecting motion information. Specifically, the motion detection module 160 selects the correlation value of the original image for each portion in which high frequency components are more dominant and selects the correlation value of the sub-sampled version of the original image for each portion in which low frequency components are more dominant.

The motion detection module 160 obtains motion information, which is expressed by direction and speed, of the image using the selected correlation value. Through these processes, the motion detection module 160 can obtain more efficient motion information.

Figure 5:
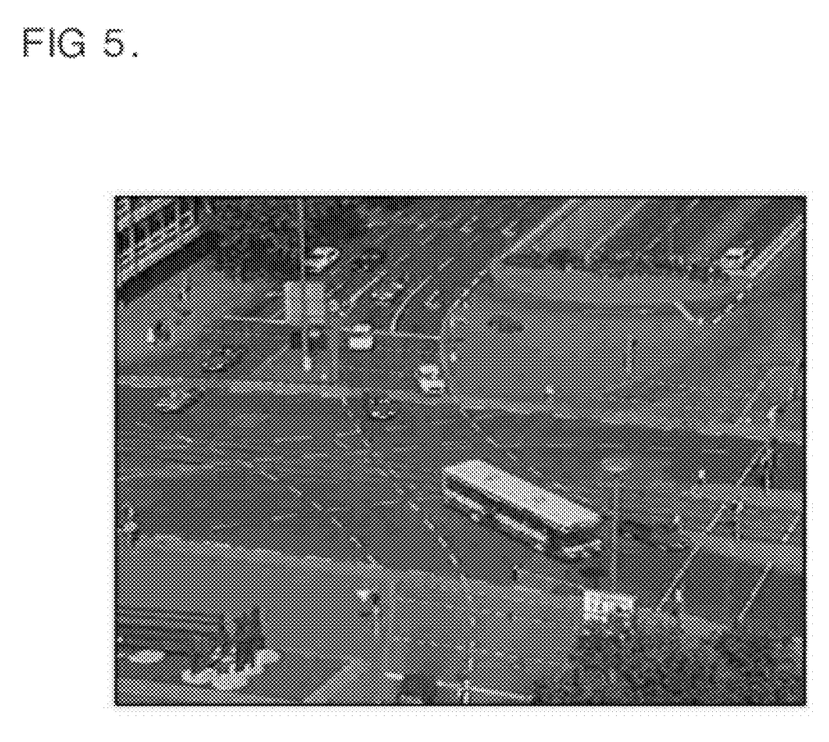
FIG. 5 illustrates an external image input to the image processing apparatus according to the present invention.

FIG. 5 illustrates an external image input to the image processing apparatus according to the present invention.

Although the image of FIG. 5 is viewed as a still image, it is actually one frame of a moving image that is captured at a certain moment. The following is analysis of an object or thing that is in motion in the picture of FIG. 5.

A bus which is turning left along a lane at an intersection and a number of cars which are entering the intersection for turning left are present in the picture at a center portion of the intersection. Cars which are moving linearly at the intersection are also viewed in the picture at the left side. The buses or cars which are turning left or moving linearly at the intersection are moving objects. The image processing apparatus according to the present invention obtains motion information of such moving objects.

On the other hand, lanes, trees, building, streetlights, and parked cars which are stationary are also shown in FIG. 5. The image processing apparatus according to the present invention does not obtain motion information of these stationary objects.

Figure 6:
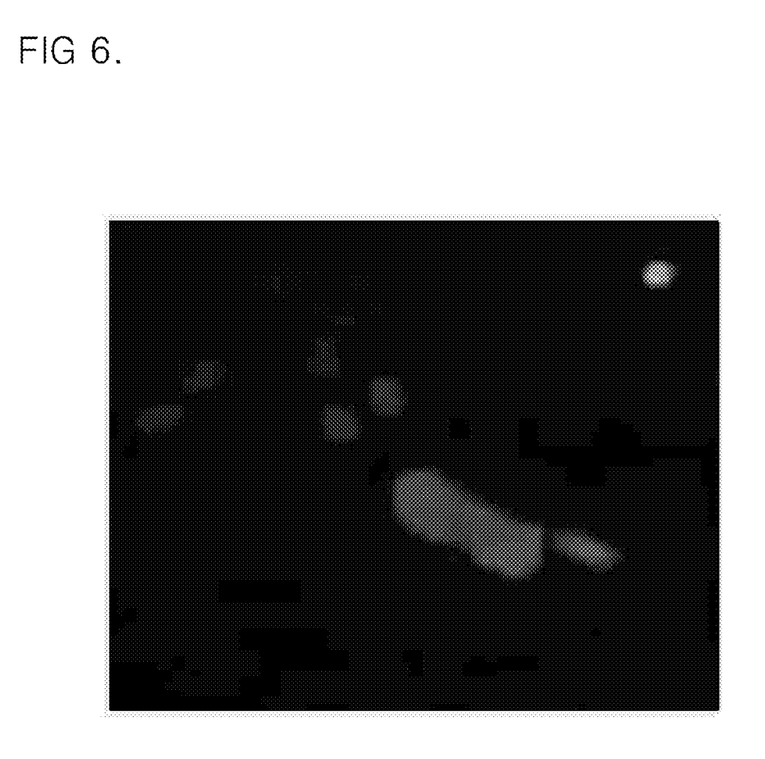
FIG. 6 illustrates motion information obtained by the image processing apparatus according to the present invention.

FIG. 6 illustrates motion information obtained by the image processing apparatus according to the present invention.

Moving objects in FIG. 5 are the bus and cars that are turning left at the intersection and the cars that are moving linearly at the intersection. Black regions in FIG. 6 correspond to portions that are not in motion in the image and white or gray regions in FIG. 6 correspond to portions that are in motion.

When the white or gray portions in FIG. 6 are compared with objects in FIG. 5, it can be seen that the white or gray portions in FIG. 6 exactly match the bus or cars that are in motion in FIG. 5.

Figure 7:
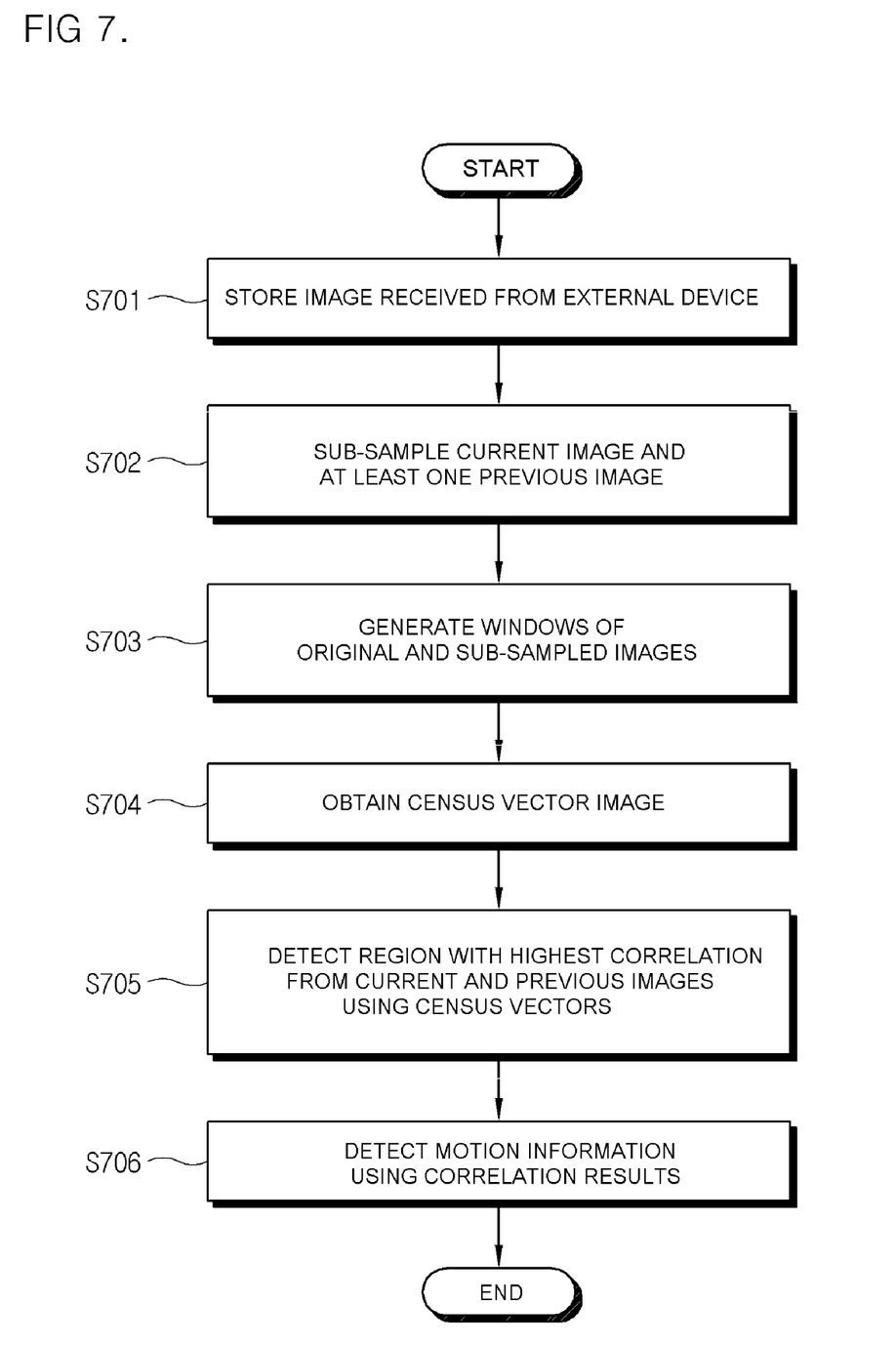
FIG. 7 illustrates an image processing method for real time motion detection according to another embodiment of the present invention.

FIG. 7 illustrates an image processing method for real time motion detection according to another embodiment of the present invention.

First, the image processing apparatus for real time motion detection according to the present invention receives an image for obtaining motion information from an external device such as a camera and stores the image in a memory (S701).

The image processing apparatus sub-samples a currently input image and at least one previous image stored at step S701 (S702).

Then, the image processing apparatus generates respective windows of the original images and sub-sampled versions thereof. A detailed description of the method for generating the windows is omitted herein since the method is known in the art (S703).

The image processing apparatus performs census transform on the original images and the sub-sampled versions using the generated windows to obtain census vector images (S704).

After step S704, the image processing apparatus compares the current image with the previous images using the census vectors to detect a region with high correlation (S705). In this case, the image processing apparatus for real time motion detection according to the present invention can select images to be compared according to the frequency components of a currently input image. Specifically, the image processing apparatus selects original images for comparison when the currently input image has high frequency components and selects sub-sampled images for comparison when the currently input image has low frequency components.

The image processing apparatus detects motion information of the current and previous images using the correlation value calculated at step S705 (S706).

As is apparent from the above description, the image processing apparatus and method for real time motion detection according to the present invention has a variety of advantages. For example, it is possible to obtain, in real time, the direction and speed of an object that is in motion in an image without using a computer system or a software program. Especially, the image processing apparatus for real time motion detection according to the present invention can be simply implemented by hardware and thus can be easily applied to robot vision, intelligent cameras, or industrial fields.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

What is claimed is:

1. An image processing apparatus for real time motion detection comprising:
   a sub-sampling module that receives and sub-samples a current image and a plurality of previous images;
   a census transform module that performs census transform on each of the sub-sampled images to obtain a census vector;
   a correlation calculation module that calculates and compares correlation values between the current image and the plurality of previous images using the census vector and detects a region having highest correlation; and
   a motion detection module that tracks positions of pixels corresponding to the region having the highest correlation to detect motion information in the images,
   wherein the sub-sampling module performs sub-sampling using, as a sub-sampling interpolation method, at least one of bilinear interpolation, nearest-neighbor interpolation, and cubic convolution interpolation.

2. The image processing apparatus according to claim 1, further comprising a buffer module including a plurality of readable and writable frame buffers and allowing simultaneous access to a currently input image and at least one previous image.

3. The image processing apparatus according to claim 1, wherein the sub-sampling module reduces a size of an original image using at least one ratio and obtains at least one sub-sampled image having a different resolution from the original image.

4. The image processing apparatus according to claim 1, wherein the correlation calculation module defines lower-level windows in each region to be compared and obtains a correlation value between the lower-level windows through an XOR operation between the lower-level windows.

5. The image processing apparatus according to claim 1, wherein the motion detection module checks frequency components of an input image and selects sub-sampled images for comparison of correlation values according to the frequency components.

6. An image processing method for real time motion detection comprising:
   receiving and sub-sampling a current image and a plurality of previous images;
   performing census transform on each of the sub-sampled images to obtain a census vector;
   calculating and comparing correlation values between the current image and the plurality of previous images based on the census vector and detecting a region having highest correlation; and
   tracking positions of pixels corresponding to the region having the highest correlation to detect motion information in the images,
   wherein the sub-sampling step includes performing sub-sampling using, as a sub-sampling interpolation method, at least one of bilinear interpolation, nearest-neighbor interpolation, and cubic convolution interpolation.

7. The image processing method according to claim 6, wherein the sub-sampling step includes reducing a size of an original image using at least one ratio and obtaining at least one sub-sampled image having a different resolution from the original image.

8. The image processing method according to claim 6, wherein the correlation calculation step includes defining lower-level windows in each region to be compared and obtaining a correlation value between the lower-level windows through an XOR operation between the lower-level windows.

9. The image processing method according to claim 6, wherein the motion detection step includes checking frequency components of an input image and selecting sub-sampled images for comparison of correlation values according to the frequency components.

* * * * *